Figures 1, 2, 3, 4:
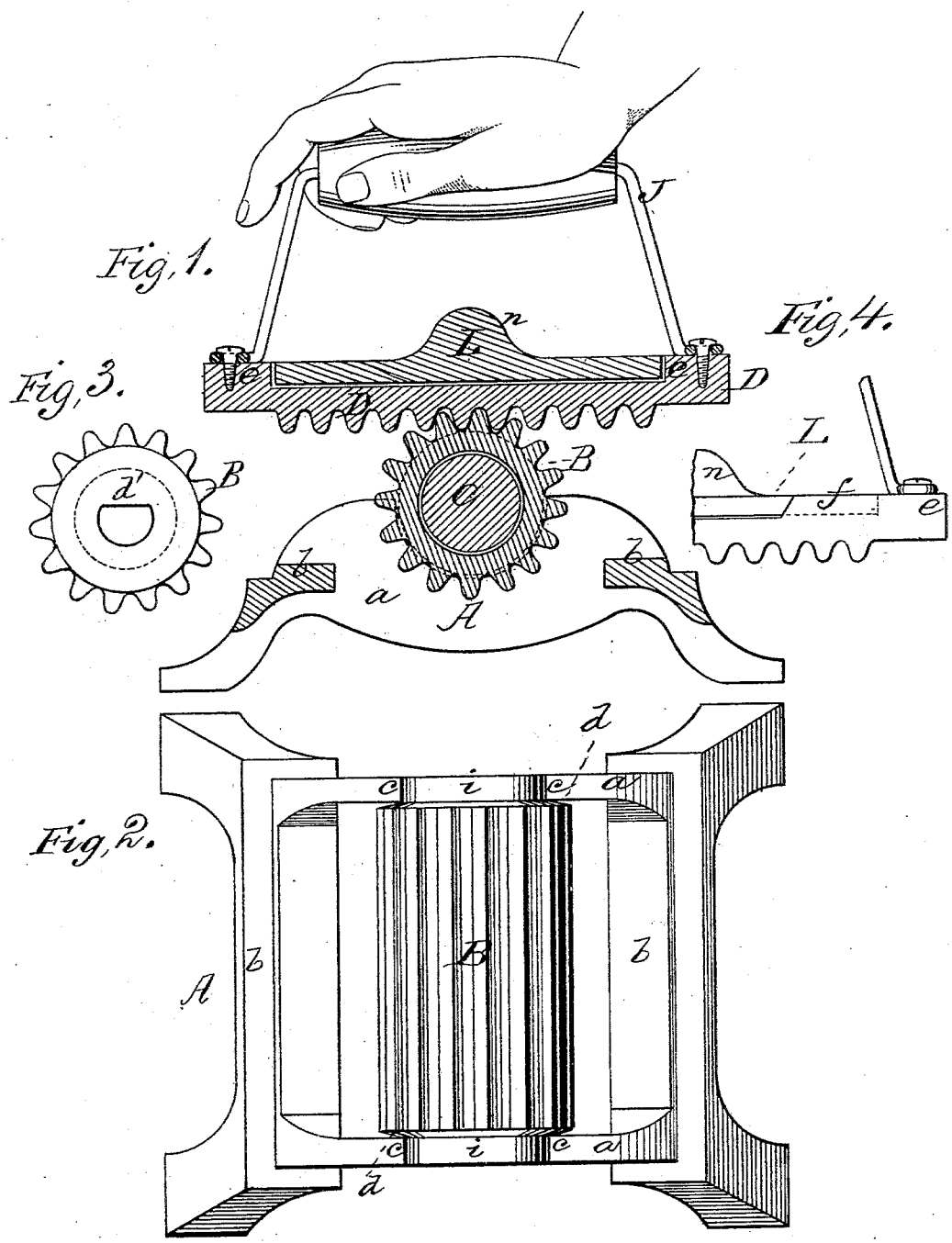

UNITED STATES PATENT OFFICE.

GEORGE R. NEBINGER, OF PHILADELPHIA, PENNSYLVANIA.

IMPROVEMENT IN CHURNS.

Specification forming part of Letters Patent No. 210,800, dated December 10, 1878; application filed October 28, 1878.

*To all whom it may concern:*

Be it known that I, GEORGE R. NEBINGER, of the city and county of Philadelphia, and State of Pennsylvania, have invented a new and useful Improvement in Churns, which improvement is fully set forth in the following specification and accompanying drawings, in which—

Figure 1 is a top or plan view of the interior of the churn embodying my invention. Fig. 2 is a vertical section at a right angle to the axis of the dasher.

Similar letters of reference indicate corresponding parts in the two figures.

My invention consists of a churn-dasher constructed of a central horizontal shaft, arms curved on their back edges and straight on their front edges, and slats attached to said arms on their curved or back edges, said slats being separate from one another and from the central shaft by narrow spaces, and thus occupying the entire length of the arms, the advantages whereof will be hereinafter fully stated.

Referring to the drawings, A represents the churn body or box, and B the dasher, which is properly mounted therein, and operated in any suitable manner. The dasher is formed of side arms, C, radiating from a central hub or shaft, and connected by transversely-extending slats D, thus forming a series of slatted arms. The arms are curved on what may be termed their "backs," or places of attachment of the slats, the curvature of each arm extending from its outer end to the front of the adjacent slat, whereby, when the arms are in horizontal positions, the inner or lower ends of the arms of one series are below the line of the center of the dasher, or said ends are between the center of the dasher and outer end of the adjacent arm.

It will be seen that while the butter is forming it is taken up by the slatted arms as they begin to assume horizontal positions, and when such positions are assumed the butter, owing to the shape of the arms C, is directed or caused to roll to the center of the dasher, and thus gathered.

The outer slat of each series of arms is broad and flat, so as to assist in collecting the butter and directing it toward the center.

The sides of the slats are inclined, so that the outer ends of the passages *a a*, between the slats, are narrower than the inner ends thereof, whereby said passages, being contracted, cause the cream to be forcibly injected therethrough and violently agitated, thus rapidly bringing the butter.

As distinctly shown in Fig. 2, the four arms are virtually composed of but two pieces, each having two straight and two curved portions, a straight and curved portion being upon one side and a straight and curved portion being upon the other. Hence, when fitted upon the shaft, the arms have straight and curved edges upon opposite sides. This greatly strengthens the arms near the shaft, and at the point between the shaft and the end of the arm, where strain by the accumulation of butter is likely to occur. It is also found easier and cheaper to form the arms in this way than it would be to give to the same a curvature upon both edges.

In this device the butter is collected and brought up so as to be readily accessible without requiring the dipping of the hand into the buttermilk. The horizontal slats collect and retain it more efficaciously than if merely a series of arms radiating from the shaft were employed, especially before the arm which is lowest in position has been brought in a vertical plane.

Having thus described my invention, what I claim as new, and desire to secure by Letters Patent, is—

The improved rotary churn-dasher herein described, consisting, essentially, of the central horizontal shaft, the arms C, curved at their back edges and straight on their front edges, and the slats D, attached to said arms on their curved or back edges, said slats being separate from one another and from the central shaft by narrow spaces, and occupying thus the entire length of the arms, as and for the purpose set forth.

GEO. R. NEBINGER.

Witnesses:
JOHN A. WIEDERSHEIM,
H. E. GARSED.

J. NEILL.
Fluting-Iron.

No. 210,801.  Patented Dec. 10, 1878.

WITNESSES
Villette Anderson
F. J. Masi.

INVENTOR
John Neill
by E. W. Anderson
ATTORNEY